United States Patent
Calzolari et al.

(10) Patent No.: US 9,913,157 B1
(45) Date of Patent: Mar. 6, 2018

(54) TECHNIQUES FOR GENERATING A COMPOSITE COLOR TO REPRESENT VALUES OF A COMMUNICATION METRIC

(71) Applicant: QUALCOMM Incorporated, San Diego, CA (US)

(72) Inventors: Diego Calzolari, San Diego, CA (US); Chintan Pravin Turakhia, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/258,716

(22) Filed: Sep. 7, 2016

(51) Int. Cl.
*H04W 24/08* (2009.01)
*H04W 72/04* (2009.01)

(52) U.S. Cl.
CPC ....... *H04W 24/08* (2013.01); *H04W 72/0446* (2013.01)

(58) Field of Classification Search
CPC ..... H04W 24/00; H04W 28/06; H04W 28/22; H04W 28/24; H04W 28/26; H04W 24/08; H04W 24/10; H04W 72/0446; H04W 72/1231
See application file for complete search history.

(56) References Cited

U.S. PATENT DOCUMENTS

| 7,505,413 | B2 | 3/2009 | Gous et al. |
| 8,817,723 | B2 | 8/2014 | Baligh et al. |
| 9,235,424 | B1 | 1/2016 | Wong et al. |
| 2011/0026918 | A1* | 2/2011 | Kim ............... H04B 10/1143 398/27 |
| 2012/0208522 | A1 | 8/2012 | Marklund et al. |
| 2015/0382148 | A1 | 12/2015 | Agarwal et al. |
| 2016/0065425 | A1 | 3/2016 | Poe et al. |
| 2016/0165456 | A1 | 6/2016 | Durvasula et al. |

FOREIGN PATENT DOCUMENTS

| GB | 2362062 A | 11/2001 |
| WO | 0210942 A1 | 2/2002 |
| WO | 2016073988 A1 | 5/2016 |

OTHER PUBLICATIONS

Tommaso R.D., "MeshAdmin: An Integrated Platform for Wireless Mesh Network Management", Telecommunications Engineering Department, IEEE Network Operations and Management Symposium, Apr. 16-20, 2012, pp. 293-301, ISSN: 1542-1201.
International Search Report and Written Opinion—PCT/US2017/040395—ISA/EPO—dated Oct. 4, 2017.

* cited by examiner

*Primary Examiner* — Daniel Lai
(74) *Attorney, Agent, or Firm* — Dalei Dong; Harrity & Harrity, LLP

(57) ABSTRACT

Aspects of the present disclosure generally relate to wireless communications. In some aspects, a device may receive information identifying a plurality of measurements of a communication metric related to a network at a plurality of time intervals. The device may determine a plurality of colors corresponding to a plurality of values of the communication metric. The plurality of values may correspond to the plurality of measurements of the communication metric at the plurality of time intervals. The device may combine the plurality of colors to generate a composite color for the communication metric.

30 Claims, 12 Drawing Sheets

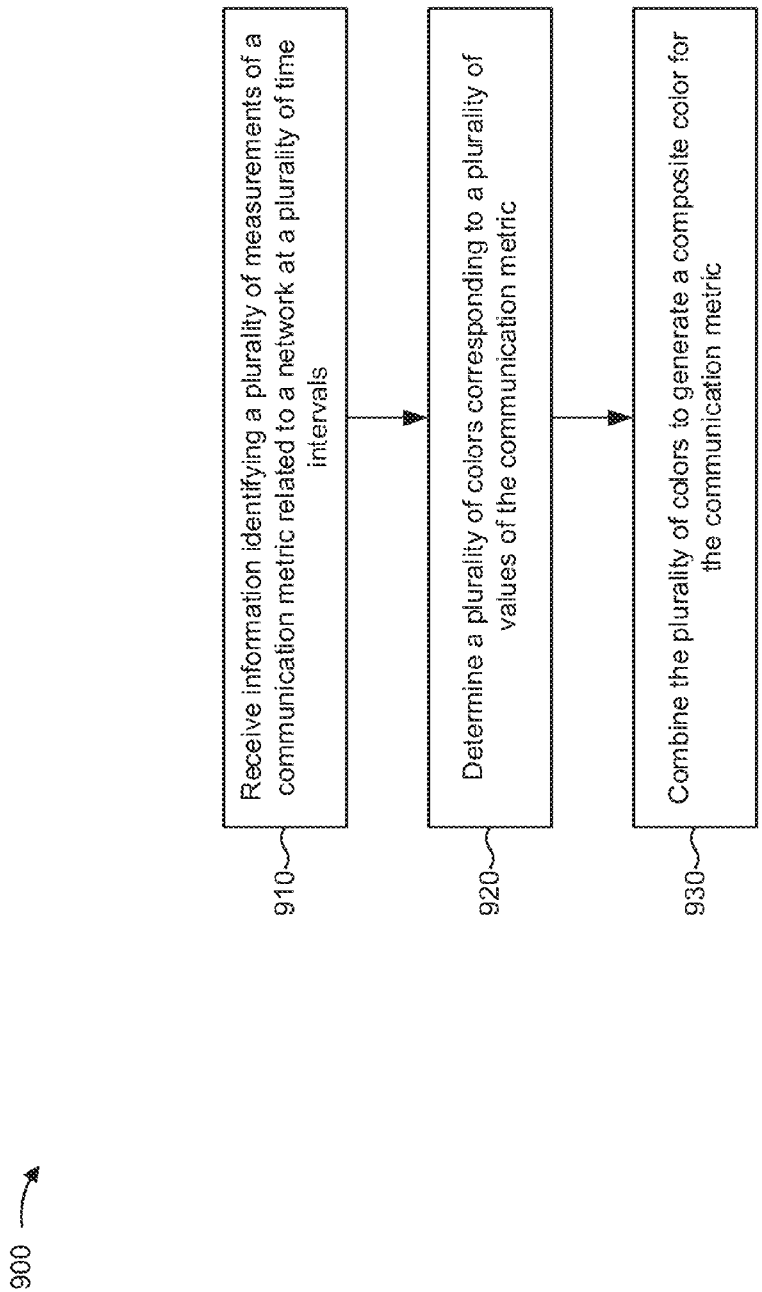

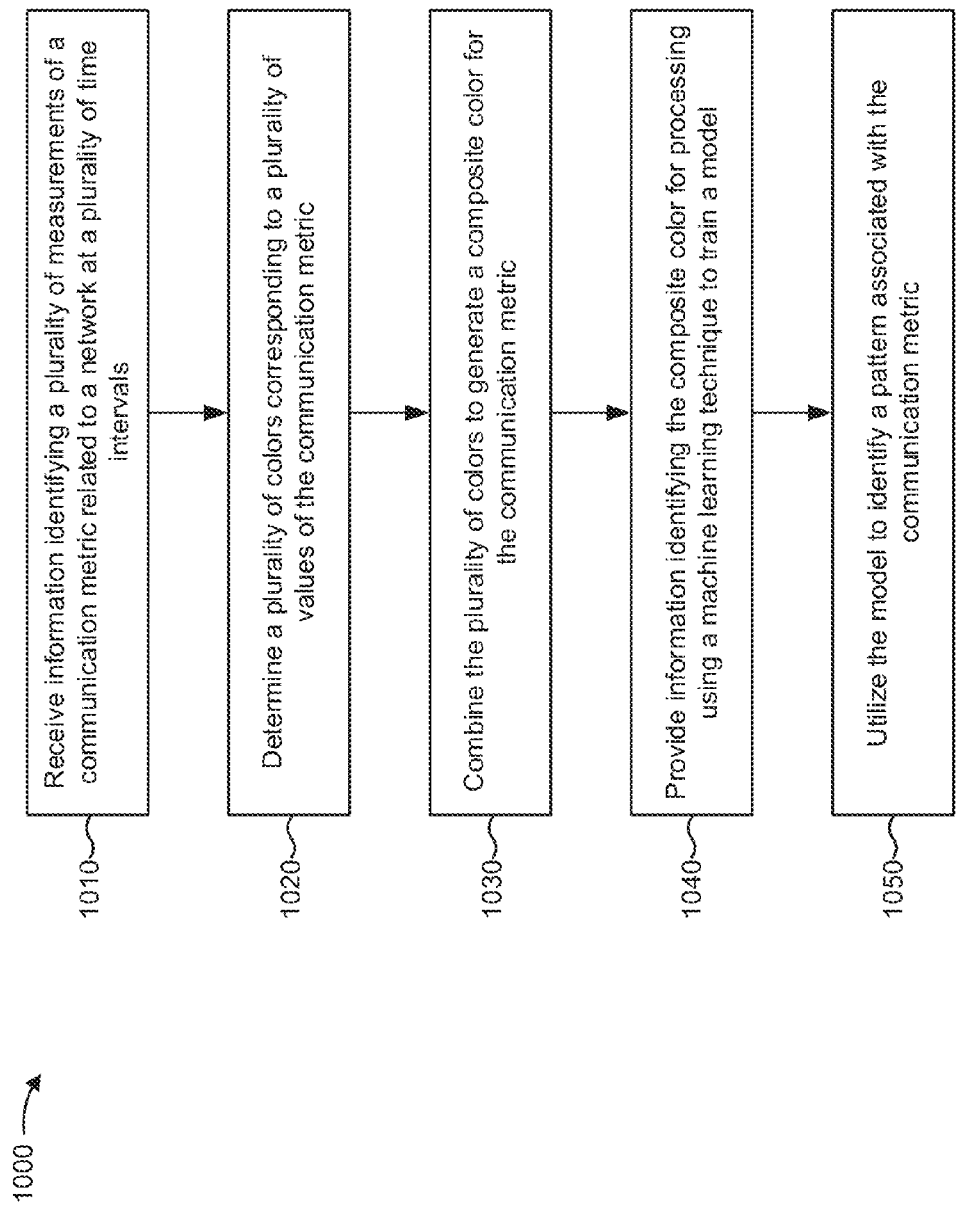

TECHNIQUES FOR GENERATING A COMPOSITE COLOR TO REPRESENT VALUES OF A COMMUNICATION METRIC

FIELD OF THE DISCLOSURE

Aspects of the present disclosure generally relate to wireless communications, and more particularly to techniques and apparatuses for generating a composite color to represent values of a communication metric.

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, using new spectrum, and integrating with other open standards using 01-DMA on the downlink (DL), SC-FDMA on the uplink (UL), and multiple-input multiple-output (MIMO) antenna technology.

SUMMARY

In some aspects, a method may include receiving, by a device, information identifying a plurality of measurements of a communication metric related to a network at a plurality of time intervals. The method may include determining, by the device, a plurality of colors corresponding to a plurality of values of the communication metric. The plurality of values may correspond to the plurality of measurements of the communication metric at the plurality of time intervals. The method may include combining, by the device, the plurality of colors to generate a composite color for the communication metric.

In some aspects, a device may include one or more processors configured to receive information identifying a plurality of measurements of a communication metric related to a network at a plurality of time intervals. The one or more processors may be configured to determine a plurality of colors corresponding to a plurality of values of the communication metric. The plurality of values may correspond to the plurality of measurements of the communication metric at the plurality of time intervals. The one or more processors may be configured to combine the plurality of colors to generate a composite color for the communication metric.

In some aspects, a non-transitory computer-readable medium may store one or more instructions. The one or more instructions, when executed by one or more processors of a device, may cause the one or more processors to receive information identifying a plurality of measurements of a communication metric related to a network at a plurality of time intervals. The one or more instructions may cause the one or more processors to determine a plurality of colors corresponding to a plurality of values of the communication metric. The plurality of values may correspond to the plurality of measurements of the communication metric at the plurality of time intervals. The one or more instructions may cause the one or more processors to combine the plurality of colors to generate a composite color for the communication metric.

In some aspects, an apparatus may include means for receiving information identifying a plurality of measurements of a communication metric related to a network at a plurality of time intervals. The apparatus may include means for determining a plurality of colors corresponding to a plurality of values of the communication metric. The plurality of values may correspond to the plurality of measurements of the communication metric at the plurality of time intervals. The apparatus may include means for combining the plurality of colors to generate a composite color for the communication metric.

Aspects generally include a method, apparatus, system, computer program product, non-transitory computer-readable medium, and user equipment as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 9 is a flow diagram of an example process for generating a composite color to represent values of a communication metric, in accordance with various aspects of the present disclosure; and FIG. 10 is a flow diagram of another example process for generating a composite color to represent values of a communication metric, in accordance with various aspects of the present disclosure.

DETAILED DESCRIPTION

Figure 1:
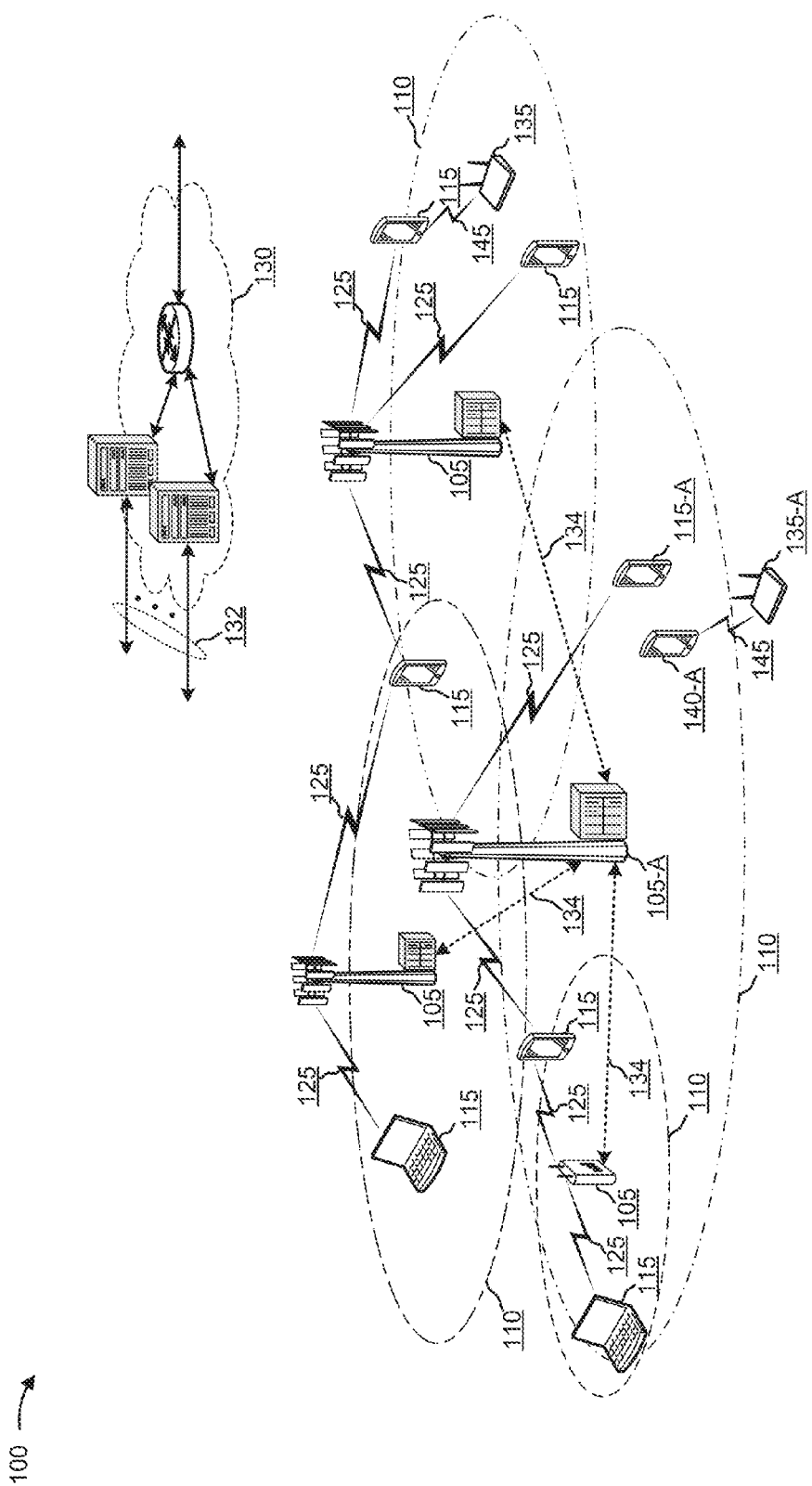
FIG. 1 is an illustration of an example wireless communication system, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

Network management procedures may be used to manage one or more network devices, such as a base station, a user equipment (UE), or the like. Each network device may identify communication metrics regarding the network, such as communication metrics relating to a modem connected to the network or the like, and may provide the communication metrics to the network management device for processing. For example, the network device may identify a signal strength metric, a bit error rate metric, a data rate metric, a reference signal received power metric, or the like. The network management device may receive the communication metrics from the network device, and may process the communication metrics to identify an alteration to improve network performance. For example, the network management device may cause the device to alter a configuration to reduce a likelihood of a radio link failure. In another example, the device may process the communication metrics, and may alter a configuration of the device to improve network performance. For example, a base station using a self-organizing network (SON) functionality may adjust a transmission frequency, a transmission strength, a beam form, or the like based at least in part on processing communication metrics regarding the base station and/or one or more other base stations.

However, processing a plurality of communication metrics including values relating to a plurality of time periods may involve an excessive utilization of processing resources. Moreover, storing and/or transmitting information identifying the values of the plurality of communication metrics may involve excessive memory resources and/or may generate excessive network traffic. Furthermore, designing customized algorithms to process the communication metrics and/or to identify a state of a network for which to perform an alteration to a configuration may involve costly and error prone development procedures.

Techniques described herein may generate a composite color to represent values of a communication metric, thereby permitting storage of information identifying the communication metric using a reduced amount of data storage resources and/or transmission of information identifying the communication metric using a reduced utilization of network resources relative to storing and/or transmitting numeric data identifying the communication metric. Moreover, a plurality of composite colors representing a plurality of communication metrics and/or a plurality of time intervals may be processed using a deep learning algorithm for image recognition to identify a state of a network. Based at least in part on representing the plurality communication metrics graphically and using an image recognition technique to identify the state of the network, a need to develop custom pattern recognition algorithms for the communication metrics is obviated and a utilization of processing resources is reduced.

The techniques described herein may be used for one or more of various wireless communication networks, such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT), such as universal terrestrial radio access (UTRA), CDMA2000, or the like. UTRA may include wideband CDMA (WCDMA) and/or other variants of CDMA. CDMA2000 may include Interim Standard (IS)-2000, IS-95 and IS-856 standards. IS-2000 may also be referred to as 1× radio transmission technology (1×RTT), CDMA2000 1×, or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

FIG. 1 is an illustration of an example wireless communication system 100, in accordance with various aspects of the disclosure. The wireless communication system 100 may include a WWAN network, such as a cellular network, and a WLAN network, such as a Wi-Fi network. The cellular network may include one or more base stations 105, 105-A, one or more UEs 115, 115-A, and a core network 130. The Wi-Fi network may include one or more WLAN access points 135, 135-A (e.g., Wi-Fi access points) and one or more WLAN stations 140, 140-A (e.g., Wi-Fi stations).

With reference to the cellular network of the wireless communication system 100, the core network 130 may provide user authentication, access authorization, tracking, Internet Protocol (IP) connectivity, and other access, routing, or mobility functions. The base stations 105, 105-A may interface with the core network 130 through backhaul links 132 (e.g., S1, etc.) and may perform radio configuration and scheduling for communication with the UEs 115, 115-A, or may operate under the control of a base station controller (not shown). In various examples, the base stations 105, 105-A may communicate, either directly or indirectly (e.g., through core network 130), with each other over backhaul links 134 (e.g., X2, etc.), which may be wired or wireless communication links.

The base stations 105, 105-A may wirelessly communicate with the UEs 115, 115-A via one or more base station antennas. Each of the base station 105, 105-A sites may provide communication coverage for a respective geographic coverage area 110. In some examples, a base station 105, 105-A may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105, 105-A may be divided into sectors making up a portion of the coverage area (not shown). The cellular network may include base stations 105, 105-A of different types (e.g., macro and/or small cell base stations). There may be overlapping geographic coverage areas 110 for different technologies.

In some examples, the cellular network may include an LTE/LTE-A network. In LTE/LTE-A networks, the term evolved Node B (eNB) may be used to describe the base stations 105, 105-A, while the term UE may be used to describe the UEs 115, 115-A. The cellular network may be a Heterogeneous LTE/LTE-A network in which different types of eNBs provide coverage for various geographical regions. For example, each eNB or base station 105, 105-A may provide communication coverage for a macro cell, a small cell, and/or another type of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, or the like) cells (e.g., component carriers).

The cellular network may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The cellular network may in some examples include a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115, 115-A and the base stations 105, 105-A or core network 130 supporting radio bearers for the user plane data. At the Physical (PHY) layer, the transport channels may be mapped to Physical channels.

The UEs 115, 115-A may be dispersed throughout the wireless communication system 100, and each UE 115, 115-A may be stationary or mobile. A UE 115, 115-A may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115, 115-A may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations 105, 105-A and network equipment, including macro eNBs, small cell eNBs, relay base stations, or the like.

The communication links 125 shown in wireless communication system 100 may carry downlink (DL) transmissions from a base station 105, 105-A to a UE 115, 115-A, and/or uplink (UL) transmissions from a UE 115, 115-A to a base station 105, 105-A. The downlink transmissions may also be called forward link transmissions, while the uplink transmissions may also be called reverse link transmissions.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency division duplexing (FDD) operation (e.g., using paired spectrum resources) or a time division duplexing (TDD) operation (e.g., using unpaired spectrum resources). Frame structures for FDD operation (e.g., frame structure type 1) and TDD operation (e.g., frame structure type 2) may be defined.

In some aspects of the wireless communication system 100, base stations 105, 105-A and/or UEs 115, 115-A may include multiple antennas for employing antenna diversity schemes to improve communication quality and reliability between base stations 105, 105-A and UEs 115, 115-A. Additionally or alternatively, base stations 105, 105-A and/or UEs 115, 115-A may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115, 115-A may be configured with multiple downlink CCs and one or more uplink CCs for carrier aggregation. Carrier aggregation may be used with both FDD and TDD component carriers.

With reference to the Wi-Fi network of the wireless communication system 100, the WLAN access points 135, 135-A may wirelessly communicate with the WLAN stations 140, 140-A via one or more WLAN access point antennas, over one or more communication links 145. In some examples, the WLAN access points 135, 135-A may communicate with the WLAN stations 140, 140-A using one or more Wi-Fi communication standards, such as an Institute of Electrical and Electronics (IEEE) Standard 802.11 (e.g., IEEE Standard 802.11a, IEEE Standard 802.11n, or IEEE Standard 802.11ac).

In some examples, a WLAN station 140, 140-A may be a cellular phone, a personal digital assistant (PDA), a wireless communication device, a handheld device, a tablet computer, a laptop computer, or the like. In some examples, an apparatus may include aspects of both a UE 115, 115-A and a WLAN station 140, 140-A, and such an apparatus may communicate with one or more base stations 105, 105-A using a first radio access technology (RAT) (e.g., a cellular RAT or multiple cellular RATs), and communicate with one or more WLAN access points 135, 135-A using a second RAT (e.g., a Wi-Fi RAT or multiple Wi-Fi RATs).

In some examples, the base stations 105, 105-A and UEs 115, 115-A may communicate over a licensed radio frequency spectrum band and/or an unlicensed radio frequency spectrum band, whereas the WLAN access points 135, 135-A and WLAN stations 140, 140-A may communicate over the unlicensed radio frequency spectrum band. The unlicensed radio frequency spectrum band may therefore be shared by the base stations 105, 105-A, the UEs 115, 115-A, the WLAN access points 135, 135-A, and/or the WLAN stations 140, 140-A.

The number and arrangement of components shown in FIG. 1 are provided as an example. In practice, wireless communication system 100 may include additional devices, fewer devices, different devices, or differently arranged devices than those shown in FIG. 1. Additionally, or alternatively, one or more devices of wireless communication system 100 may perform one or more functions described as being performed by another one or more devices of wireless communication system 100.

Figure 2:
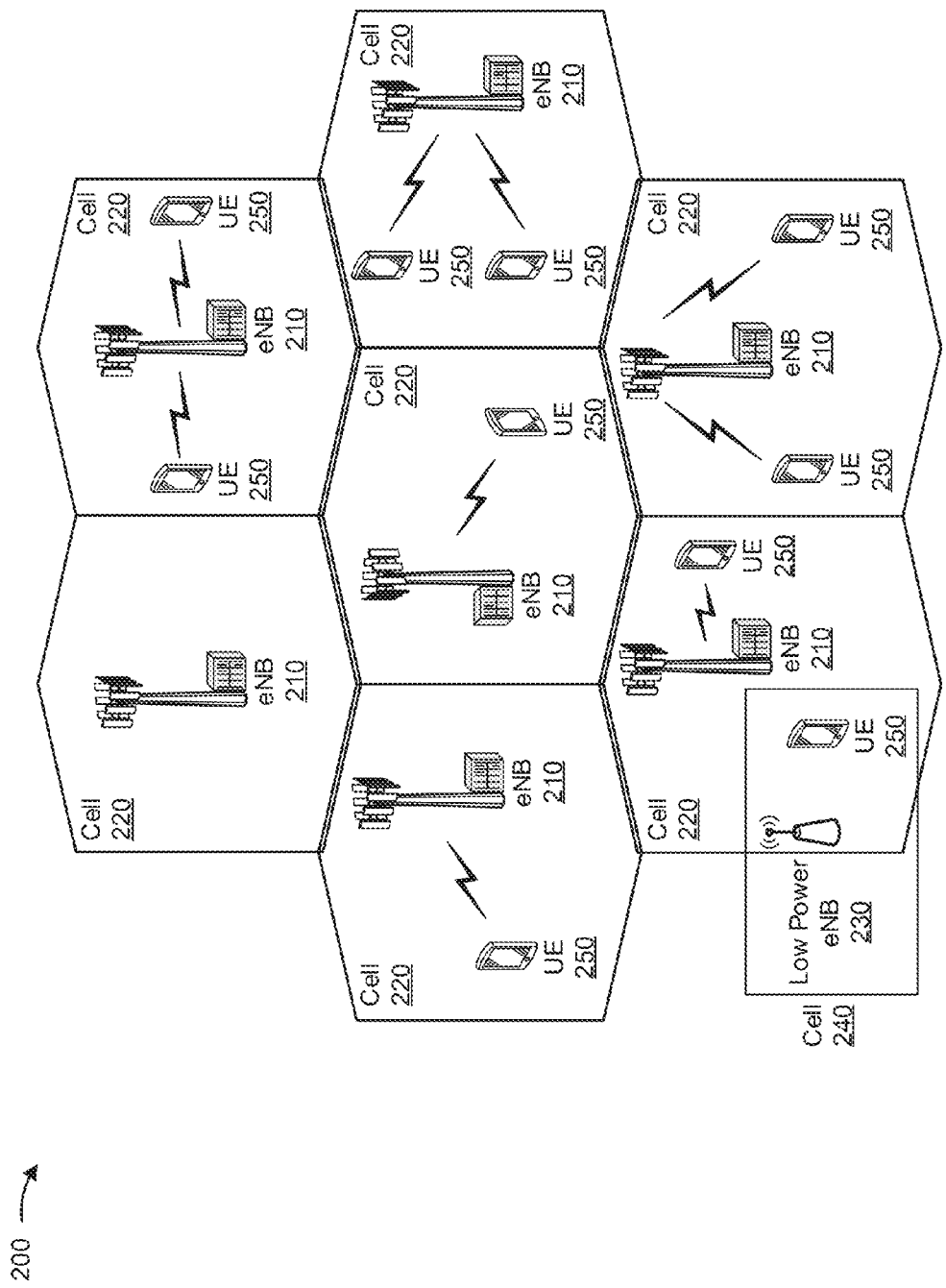
FIG. 2 is a diagram illustrating an example access network in an LTE network architecture, in accordance with various aspects of the present disclosure.

FIG. 2 is a diagram illustrating an example access network 200 in an LTE network architecture, in accordance with various aspects of the present disclosure. As shown, access network 200 may include a plurality of eNBs 210 that serve a corresponding plurality of cellular regions (cells) 220, a plurality of low power eNBs 230 that serve a corresponding plurality of cells 240, and a plurality of UEs 250.

Each eNB 210 may be assigned to a respective cell 220 and may be configured to provide an access point to a RAN. For example, eNB 210 may provide an access point for UE 250 to a RAN (e.g., eNB 210 may correspond to base station 105, shown in FIG. 1). UE 250 may correspond to UE 115, shown in FIG. 1. FIG. 2 does not illustrate a centralized controller for example access network 200, but access network 200 may use a centralized controller in some aspects. The eNBs 210 may perform radio related functions including radio bearer control, admission control, mobility control, scheduling, security, and network connectivity.

As shown in FIG. 2, one or more low power eNBs 230 may serve respective cells 240, which may overlap with one or more cells 220 served by eNBs 210. The low power eNBs 230 may correspond to base station 105, shown in FIG. 1. A low power eNB 230 may be referred to as a remote radio head (RRH). The low power eNB 230 may include a femto cell eNB (e.g., home eNB (HeNB)), a pico cell eNB, a micro cell eNB, or the like.

A modulation and multiple access scheme employed by access network 200 may vary depending on the particular telecommunications standard being deployed. In LTE applications, OFDM is used on the downlink (DL) and SC-FDMA is used on the uplink (UL) to support both frequency division duplexing (FDD) and time division duplexing (TDD). The various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing WCDMA and other variants of CDMA (e.g., such as TD-SCDMA, GSM employing TDMA, E-UTRA, or the like), UMB, IEEE 802.11 (Wi-Fi), IEEE 802.16 (WiMAX), IEEE 802.20, Flash-OFDM employing OFDMA, or the like. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a one or more devices shown in FIG. 2 may perform one or more functions described as being performed by another one or more devices shown in FIG. 2.

Figure 3:
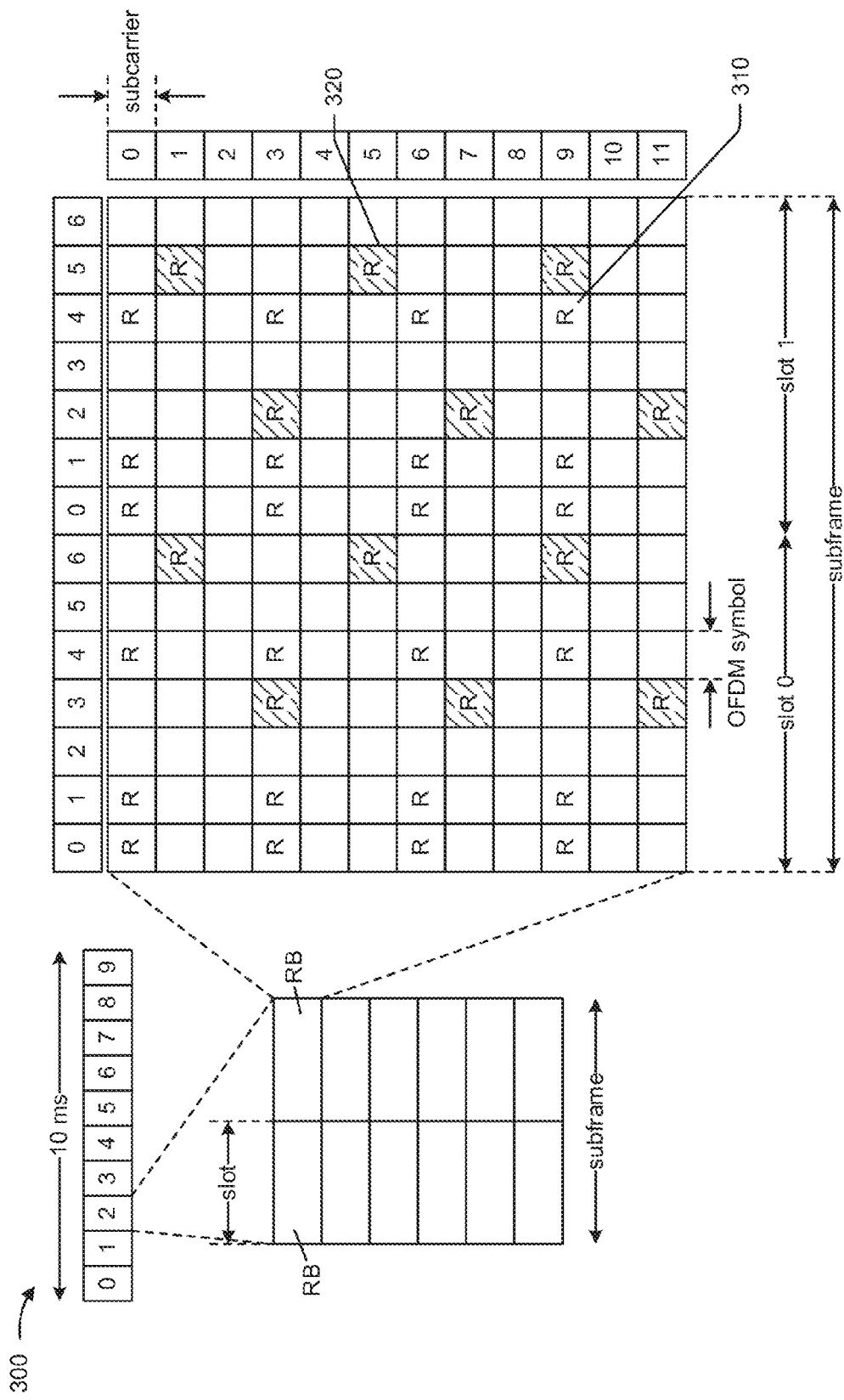
FIG. 3 is a diagram illustrating an example of a downlink (DL) frame structure in LTE, in accordance with various aspects of the present disclosure.

FIG. 3 is a diagram illustrating an example 300 of a downlink (DL) frame structure in LTE, in accordance with various aspects of the present disclosure. A frame (e.g., of 10 ms) may be divided into 10 equally sized sub-frames with indices of 0 through 9. Each sub-frame may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 310 and R 320, include DL reference signals (DL-RS). The DL-RS include Cell-specific RS (CRS) (also sometimes called common RS) 310 and UE-specific RS (UE-RS) 320. UE-RS 320 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry some system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to one or more UEs in portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only some combinations of REGs may be allowed for the PDCCH.

A UE may know the specific REGs used for the PHICH and the PCFICH.

The UE may search different combinations of REGs for the PDCCH. The number of combinations to search is typically less than the number of allowed combinations for the PDCCH. An eNB may send the PDCCH to the UE in any of the combinations that the UE will search.

As indicated above, FIG. 3 is provided as an example. Other examples are possible and may differ from what was described above in connection with FIG. 3.

Figure 4:
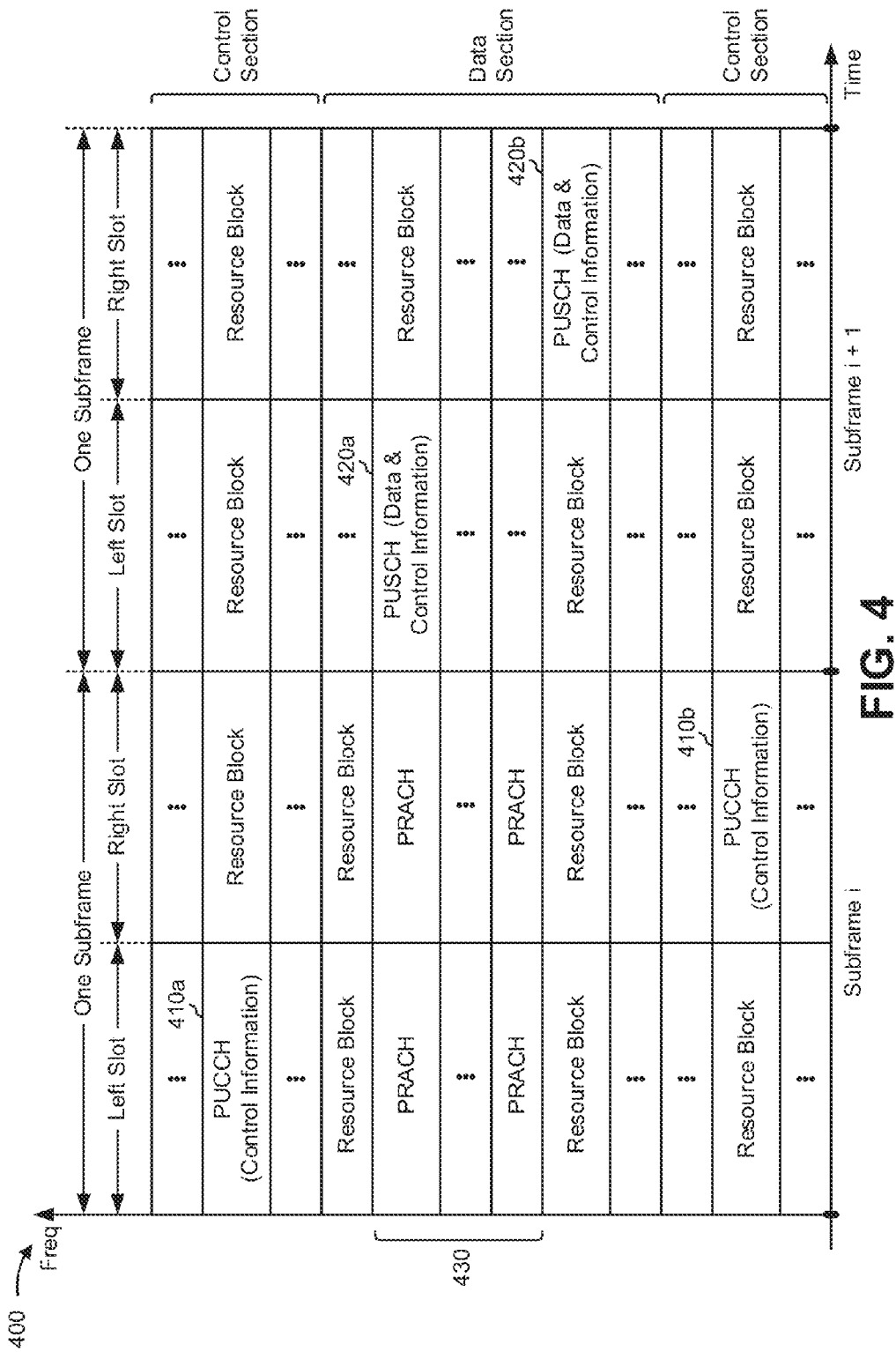
FIG. 4 is a diagram illustrating an example of an uplink (UL) frame structure in LTE, in accordance with various aspects of the present disclosure.

FIG. 4 is a diagram illustrating an example 400 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. In some aspects, the UE may transmit only data or both data and control information in a physical UL shared channel (PUSCH) on the assigned resource blocks in the data section. A UL transmission may span both slots of a subframe and may hop across frequencies.

A plurality of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to some time and frequency resources. There is no frequency hopping for the PRACH. The PRACH attempt is carried in a single subframe (e.g., of 1 ms) or in a sequence of few contiguous subframes.

As indicated above, FIG. 4 is provided as an example. Other examples are possible and may differ from what was described above in connection with FIG. 4.

Figure 5:
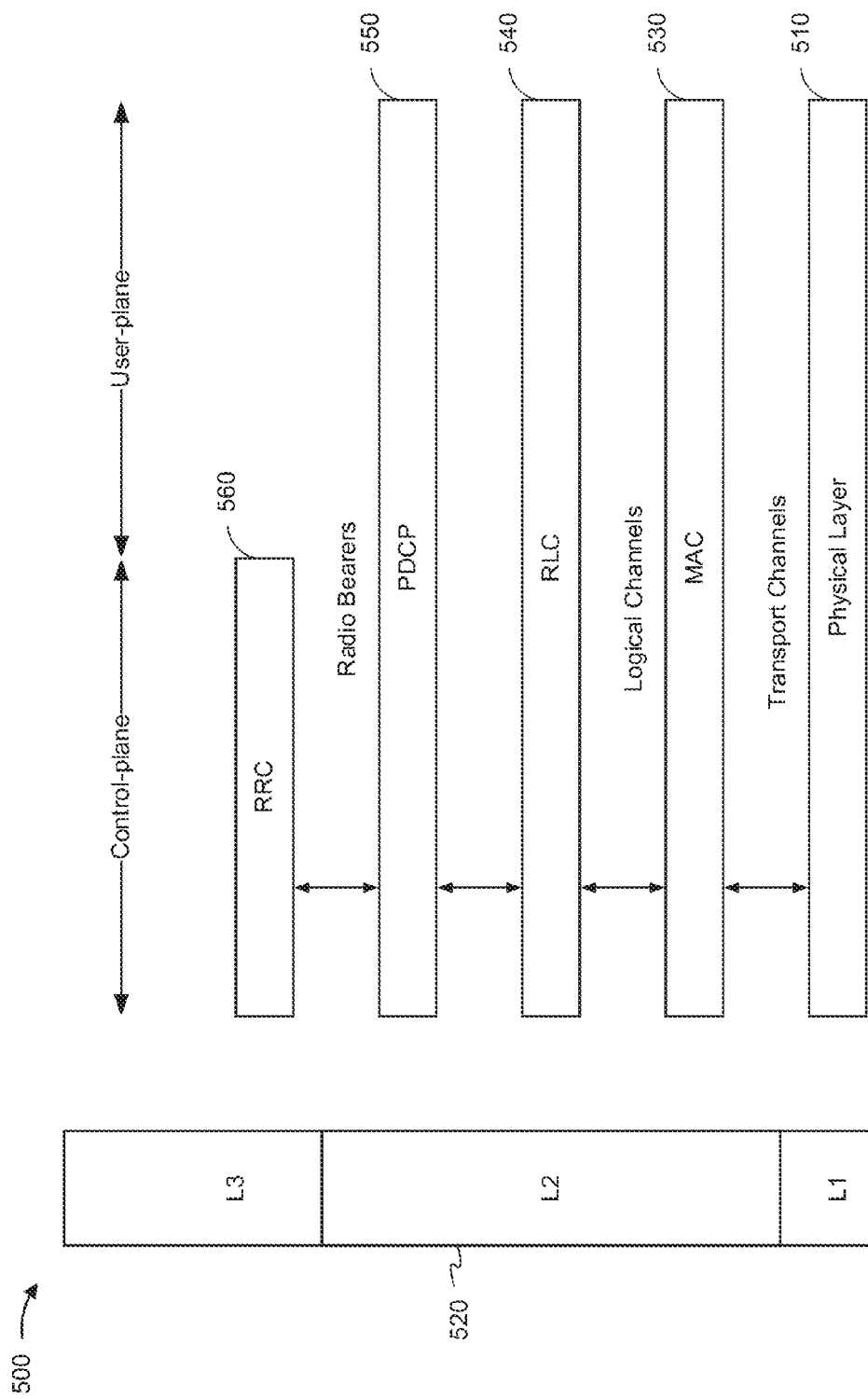
FIG. 5 is a diagram illustrating an example of a radio protocol architecture for a user plane and a control plane in LTE, in accordance with various aspects of the present disclosure.

FIG. 5 is a diagram illustrating an example 500 of a radio protocol architecture for a user plane and a control plane in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 510. Layer 2 (L2 layer) 520 is above the physical layer 510 and is responsible for the link between the UE and eNB over the physical layer 510.

In the user plane, the L2 layer 520 includes a media access control (MAC) sublayer 530, a radio link control (RLC) sublayer 540, and a packet data convergence protocol (PDCP) 550 sublayer, which are terminated at the eNB on the network side. Although not shown, the UE may have several upper layers above the L2 layer 520 including a network layer (e.g., IP layer) that is terminated at a packet data network (PDN) gateway on the network side, and an application layer that is terminated at the other end of the connection (e.g., far end UE, server, etc.).

The PDCP sublayer 550 provides multiplexing between different radio bearers and logical channels. The PDCP sublayer 550 also provides header compression for upper layer data packets to reduce radio transmission overhead, security by ciphering the data packets, and handover support for UEs between eNBs. The RLC sublayer 540 provides segmentation and reassembly of upper layer data packets, retransmission of lost data packets, and reordering of data packets to compensate for out-of-order reception due to hybrid automatic repeat request (HARQ). The MAC sublayer 530 provides multiplexing between logical and transport channels. The MAC sublayer 530 is also responsible for allocating the various radio resources (e.g., resource blocks) in one cell among the UEs. The MAC sublayer 530 is also responsible for HARQ operations.

In the control plane, the radio protocol architecture for the UE and eNB is substantially the same for the physical layer 510 and the L2 layer 520 with the exception that there is no header compression function for the control plane. In some aspects, integrity protection may be provided for the control plane data. The control plane also includes a radio resource control (RRC) sublayer 560 in Layer 3 (L3 layer). The RRC sublayer 560 is responsible for obtaining radio resources (i.e., radio bearers) and for configuring the lower layers using RRC signaling between the eNB and the UE.

As indicated above, FIG. 5 is provided as an example. Other examples are possible and may differ from what was described above in connection with FIG. 5.

Figure 6:
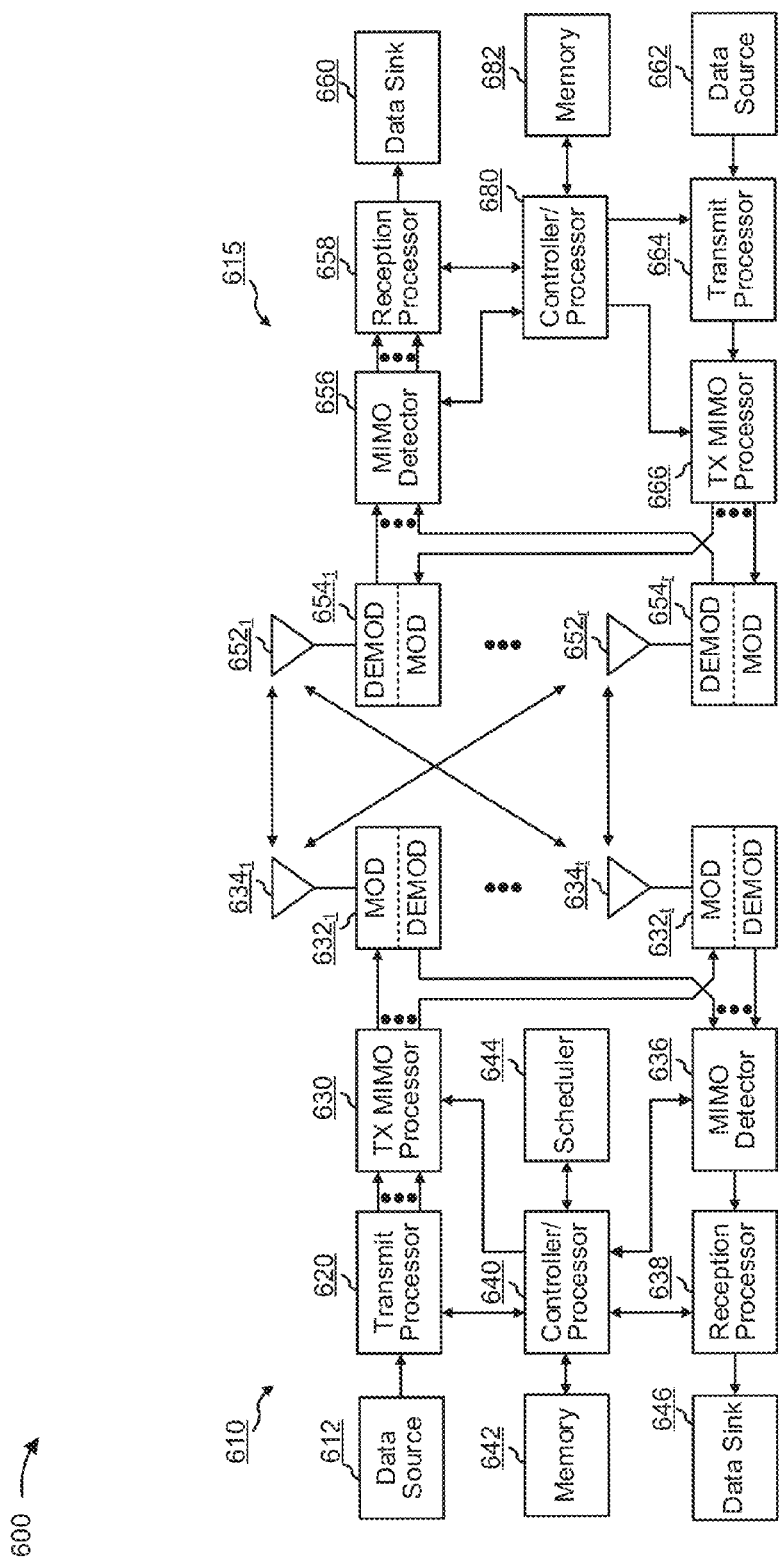
FIG. 6 is a diagram illustrating example components of a communication system including a base station and a UE, in accordance with various aspects of the present disclosure.

FIG. 6 is an illustration of example components of a communication system 600 including a base station 610 and a UE 615, in accordance with various aspects of the present disclosure. In some aspects, base station 610 may correspond to one or more of the base stations and/or eNBs 105, 105-A, 210, or 230 described with reference to FIG. 1 or 2. In some aspects, UE 615 may correspond to one or more of the UEs 115, 115-A, or 250 described above with reference to FIG. 1 or 2. Base station 610 may be equipped with antennas $634_{1-t}$, and UE 615 may be equipped with antennas $652_{1-r}$, wherein t and r are integers greater than or equal to one.

At base station 610, a base station transmit processor 620 may receive data from a base station data source 612 and control information from a base station controller/processor 640. The control information may be carried on the Physical Broadcast Channel (PBCH), the Physical Control Format Indicator Channel (PCFICH), the Physical Hybrid-ARQ Indicator Channel (PHICH), the Physical Downlink Control Channel (PDCCH), or the like. The data may be carried on the Physical Downlink Shared Channel (PDSCH), for example. Base station transmit processor 620 may process (e.g., encode and symbol map) the data and control information to obtain data symbols and control symbols, respectively. Base station transmit processor 620 may also generate reference symbols, e.g., for the PSS, SSS, and cell-specific reference signal (RS). A base station transmit (TX) multiple-input multiple-output (MIMO) processor 630 may perform spatial processing (e.g., precoding) on the data symbols, the control symbols, and/or the reference symbols, if applicable, and may provide output symbol streams to base station modulators/demodulators (MODs/DEMODs) $632_{1-t}$. Each base station modulator/demodulator 632 may process a respective output symbol stream (e.g., for orthogonal frequency-division multiplexing (OFDM), or the like) to obtain an output sample stream. Each base station modulator/demodulator 632 may further process (e.g., convert to analog, amplify, filter, and upconvert) the output sample stream to obtain a downlink signal. Downlink signals from modulators/demodulators $632_{1-t}$, may be transmitted via antennas $634_{1-t}$, respectively.

At UE 615, UE antennas $652_{1-r}$, may receive the downlink signals from base station 610 and may provide received signals to UE modulators/demodulators (MODs/DEMODs) $654_{1-r}$, respectively. Each UE modulator/demodulator 654 may condition (e.g., filter, amplify, downconvert, and digitize) a respective received signal to obtain input samples. Each UE modulator/demodulator 654 may further process the input samples (e.g., for OFDM, etc.) to obtain received symbols. A UE MIMO detector 656 may obtain received symbols from all UE modulators/demodulators $654_{1-r}$, and perform MIMO detection on the received symbols, if applicable, and provide detected symbols. A UE reception processor 658 may process (e.g., demodulate, deinterleave, and decode) the detected symbols, provide decoded data for UE 615 to a UE data sink 660, and provide decoded control information to a UE controller/processor 680.

On the uplink, at UE 615, a UE transmit processor 664 may receive and process data (e.g., for the Physical Uplink Shared Channel (PUSCH)) from a UE data source 662 and control information (e.g., for the Physical Uplink Control Channel (PUCCH)) from UE controller/processor 680. UE transmit processor 664 may also generate reference symbols for a reference signal. The symbols from UE transmit processor 664 may be precoded by a UE TX MIMO processor 666, if applicable, may be further processed by UE modulator/demodulators $654_{1-r}$, (e.g., for SC-FDM, etc.), and may be transmitted to base station 610. At base station 610, the uplink signals from UE 615 may be received by base station antennas 634, processed by base station modulators/demodulators 632, detected by a base station MIMO detector 636, if applicable, and further processed by a base station reception processor 638 to obtain decoded data and control information sent by UE 615. Base station reception processor 638 may provide the decoded data to a base station data sink 646 and the decoded control information to base station controller/processor 640.

Base station controller/processor 640 and UE controller/processor 680 may direct operation of base station 610 and UE 615, respectively. Base station controller/processor 640 and/or other processors and modules at base station 610 may perform or direct, for example, execution of one or more blocks illustrated in FIG. 9, FIG. 10, and/or other processes for the techniques described herein. UE controller/processor 680 and/or other processors and modules at UE 615 may also perform or direct, for example, execution of one or more blocks illustrated in FIG. 9, FIG. 10, and/or other processes for the techniques described herein. A base station memory 642 and a UE memory 682 may store data and program code for base station 610 and UE 615, respectively.

A scheduler 644 may schedule UEs 615 for data transmission on the downlink and/or uplink.

In some aspects, base station 610 may include means for generating a composite color to represent a communication metric. In some aspects, UE 615 may include means for generating a composite color to represent a communication metric, as described herein. In some aspects, the aforementioned means may be base station controller/processor 640 or UE controller/processor 680, base station memory 642 or UE memory 682, base station reception processor 638 or UE reception processor 658, base station MIMO detector 636 or UE MIMO detector 656, base station modulators/demodulators 632 or UE modulators/demodulators 654, and/or base station antennas 634 or UE antennas 652 configured to perform the functions recited by the aforementioned means. In some aspects, the aforementioned means may be a module, at least partially implemented in hardware, or any apparatus configured to perform the functions recited by the aforementioned means.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single components shown in FIG. 6 may be implemented as multiple, distributed components. Additionally, or alternatively, one or more components shown in FIG. 6 may perform one or more functions described as being performed by another one or more components shown in FIG. 6.

Figure 7A:
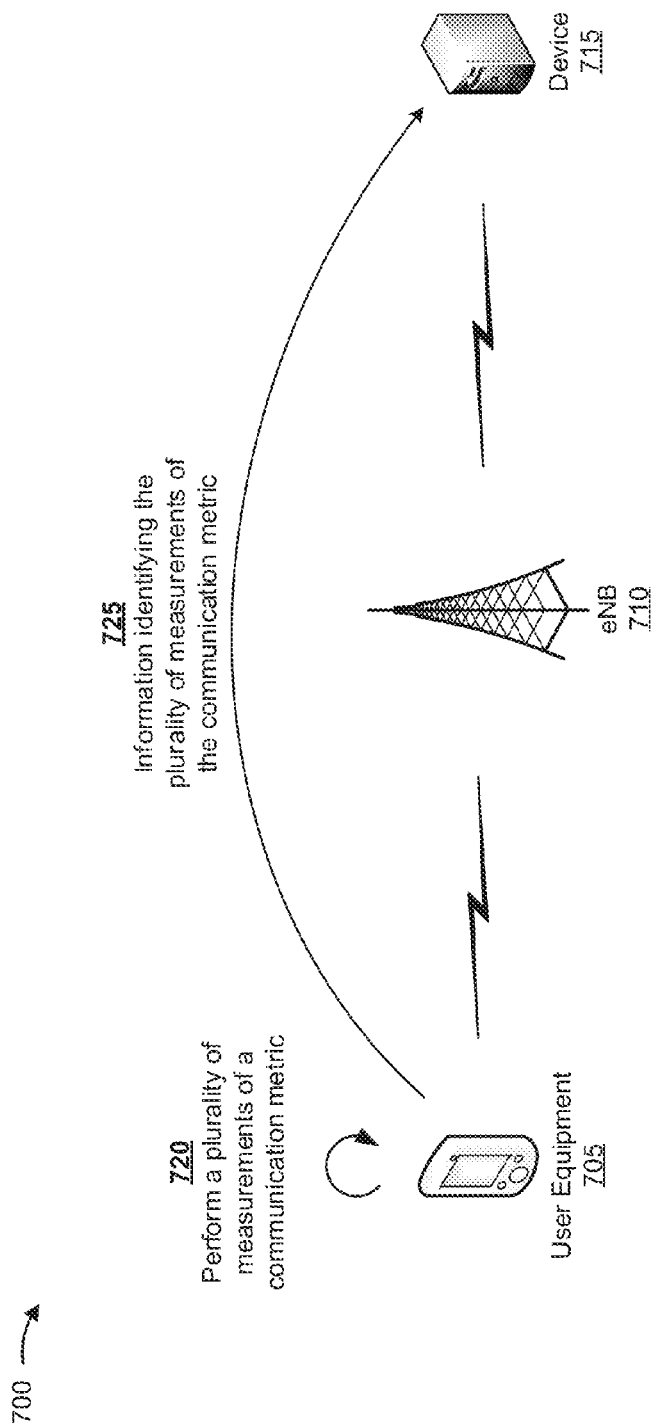
FIGS. 7A and 7B are diagrams illustrating an example of generating a composite color to represent values of a communication metric, in accordance with various aspects of the present disclosure.
Figure 7B:
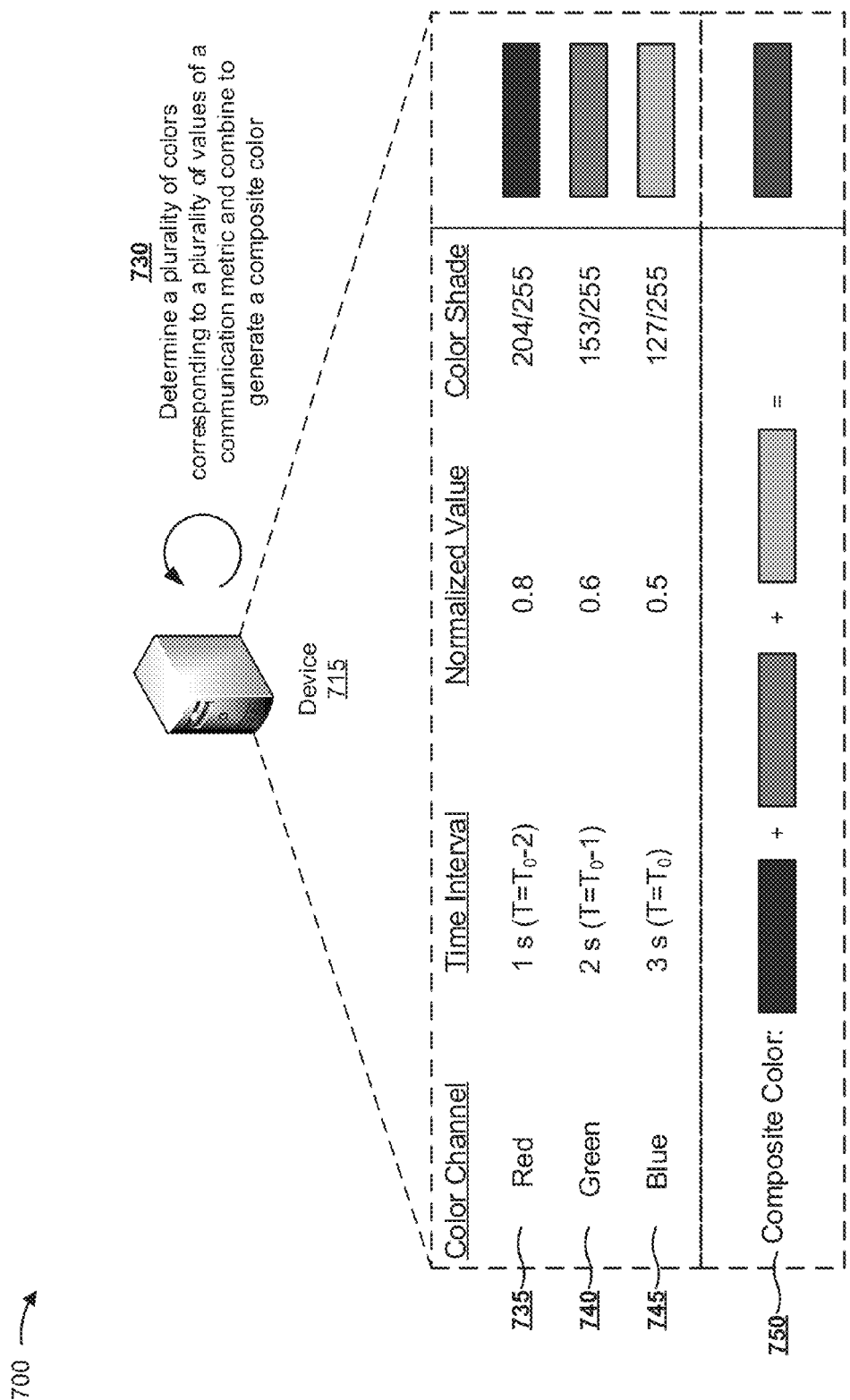

FIGS. 7A and 7B are diagrams illustrating examples 700 of generating a composite color to represent a communication metric, in accordance with various aspects of the present disclosure. FIGS. 7A and 7B show an example of generating a composite color to represent a communication metric.

As shown in FIG. 7A, example 700 may include a UE 705, an eNB 710, and a device 715. In some aspects, UE 705 may correspond to one or more of the UEs 115, 115-A, 250, or 615 described above with reference to FIG. 1, 2, or 6. In some aspects, eNB 710 may correspond to one or more of the base stations and/or eNBs 105, 105-A, 210, 230, or 610 described with reference to FIG. 1, 2, or 6. In some aspects, device 715 may correspond to one or more UEs 115, 115-A, 250, 615, or 705 described herein with reference to FIG. 1, 2, 6, 7A, or 7B; one or more eNBs 105, 105-A, 210, 230, 610, or 710 described herein with reference to FIG. 1, 2, 6, 7A, or 7B; a network management device; or the like.

As further shown in FIG. 7A, and by reference number 720, UE 705 may perform a plurality of measurements of a communication metric. For example, UE 705 may determine a value for a communication metric, such as a metric relating to a result of a checksum (e.g., a cyclic redundancy check (CRC) result), a reference signal received power (RSRP) metric, or the like, at a plurality of time intervals. In this case, UE 705 may determine a first value for the communication metric at a first time interval (e.g., time T=1 second), a second value for the communication metric at a second time interval (e.g., time T=2 seconds), and a third value for the communication metric at a third time interval (e.g., time T=3 seconds). As shown by reference number 725, UE 705 may provide the plurality of measurements of the communication metric to device 715 (e.g., via eNB 710) for processing. Device 715 may receive the plurality of measurements of the communication metric and/or one or more other pluralities of measurements of one or more other communication metrics from one or more other UEs 705, eNBs 710, or the like. In some aspects, device 715 may receive the plurality of measurements of the communication metric based at least in part on requesting the plurality of measurements of the communication metric.

As shown in FIG. 7B, and by reference number 730, device 715 may determine a plurality of colors corresponding to a plurality of values of the communication metric, and may combine the plurality of colors to generate a composite color representing the communication metric. For example, device 715 may determine three colors corresponding to three color channels, such as a red color of a red color channel, a green color of a green color channel, and a blue color of a blue color channel for a red green blue (RGB) color model. In this case, for a composite color representing the communication metric at the third time interval (e.g., time $T=T_0=3$ seconds), device 715 may determine the red color of the red color channel based at least in part on the first value of the communication metric at the first time interval (e.g., time $T=T_0-2=1$ second), the green color of the green color channel based at least in part on the second value of the communication metric at the second time interval (e.g., time $T=T_0-1=2$ seconds), and the blue color of the blue color channel based at least in part on the third value of the communication metric at this third time interval.

In another example, device 715 may utilize another color model, such as a cyan, magenta, yellow, key (CMYK) color model, a Pantone model, a grayscale model, or the like, and may determine a plurality of colors for a plurality of color channels of the other color model.

As further shown in FIG. 7B and by reference number 735, device 715 determines the red color (e.g., a color shade of red) for the red color channel corresponding to the first value of the communication metric at 1 second. Device 715 may normalize the first value of the communication metric at $T_0-2$ (e.g., on a scale, such as −1 to 1, 0 to 1, or the like), and may select the first shade for the red color channel based at least in part on the normalized value (e.g., a shade of red, 204/255). As shown by reference number 740, device 715 determines the green color for the green color channel corresponding to $T_0-1$ based at least in part on a normalized value of the communication metric at $T_0-1$. As shown by reference number 745, device 715 determines a blue color for the blue color channel corresponding to a normalized value of the communication metric at $T_0$.

As further shown in FIG. 7B, and by reference number 750, device 715 may combine the plurality of colors to generate the composite color corresponding to $T_0$. For example, device 715 may overlay the plurality of colors to generate the composite color, add the plurality of colors to generate the composite color, average the plurality of colors to generate the composite color, or the like. In this way, device 715 generates a composite color that represents a time-change (e.g., a trend) in the communication metric at $T_0$. For example, when the composite color is red dominant (e.g., appears as a shade of red), the composite color may indicate that a value of the communication metric is decreasing at $T_0$ based at least in part on the shade of the red color channel being a darker shade than the shade of the blue color channel. Similarly, when the composite color is blue dominant (e.g., appears as a shade of blue), the composite color may indicate that a value of the communication metric is increasing at $T_0$ based at least in part on the shade of the blue color channel being a darker shade than the shade of the red color channel. Similarly, when the composite color is white dominant or black dominant (e.g., appears as a shade of white or a shade of black), the composite color may indicate that a value of the communication metric is stabilized at a minimum normalized value or a maximum normalized value based at least in part on the three color channels being relatively light shades or relatively dark shades.

As indicated above, FIGS. 7A and 7B are provided as an example. Other examples are possible and may differ from what was described in connection with FIGS. 7A and 7B.

Figure 8A:
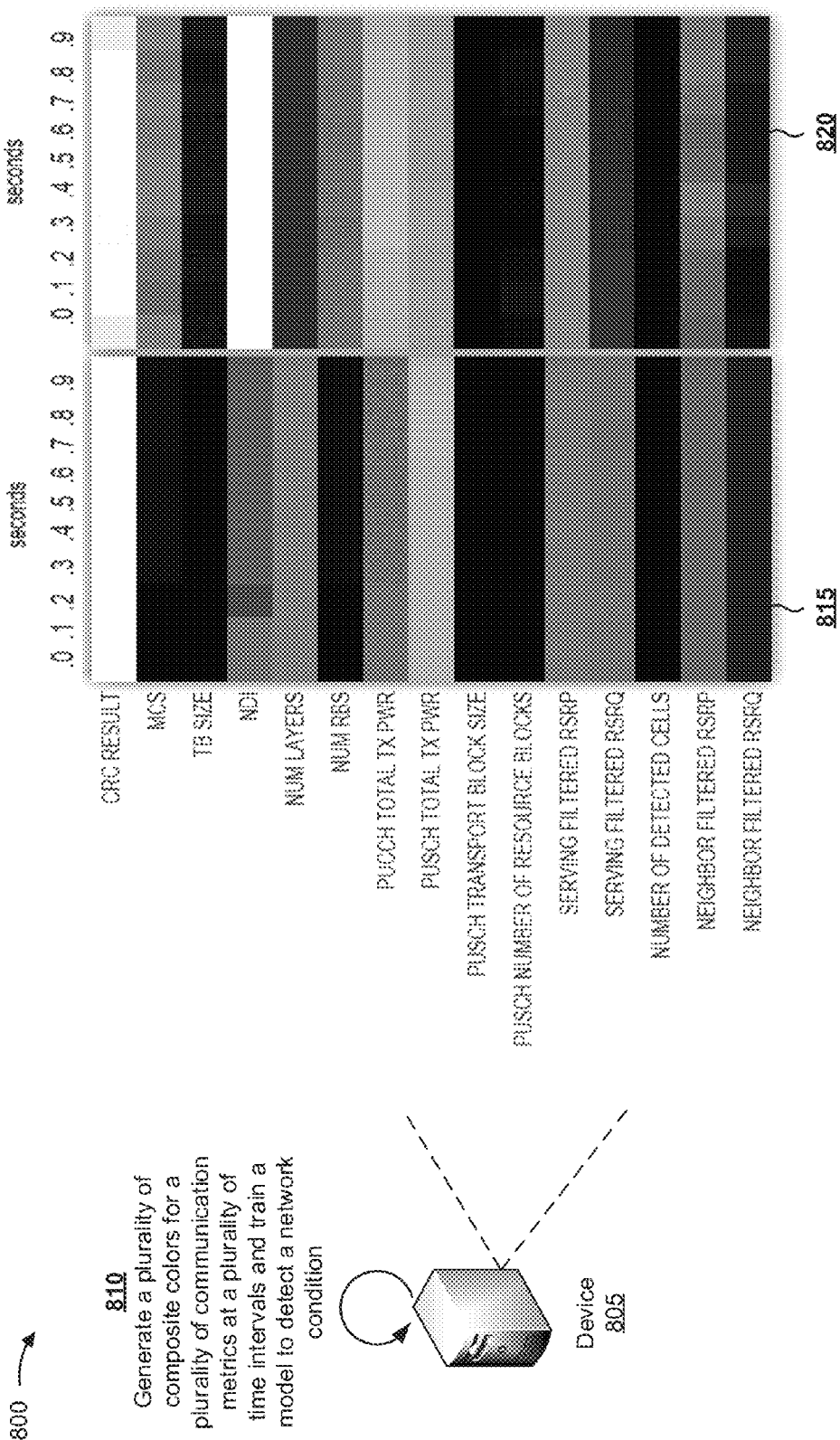
FIGS. 8A and 8B are diagrams illustrating another example of generating a composite color to represent values of a communication metric, in accordance with various aspects of the present disclosure.
Figure 8B:
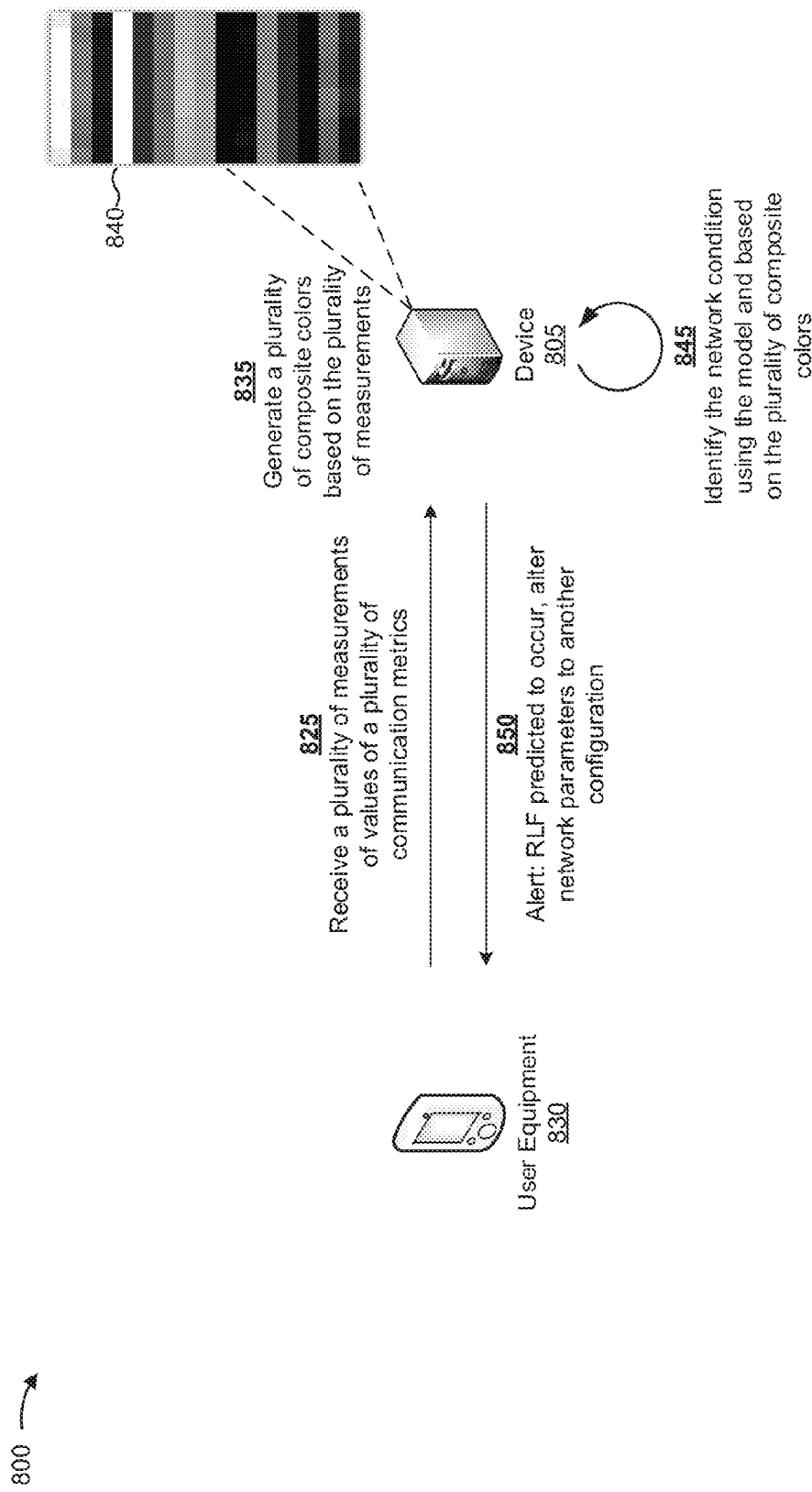

FIGS. 8A and 8B are diagrams illustrating an example 800 of generating a composite color to represent values of a communication metric, in accordance with various aspects of the present disclosure. FIGS. 8A and 8B show an example of utilizing a plurality of composite colors representing a plurality of communication metrics to identify a condition of a network.

As shown in FIG. 8A, example 800 may include a device 805. In some aspects, device 805 may correspond to one or more of the devices 715 described above with reference to FIG. 7A or 7B; one or more of the UEs 115, 115-A, 250, 615, or 705 described above with reference to FIG. 1, 2, 6, 7A, or 7B; one or more eNBs 105, 105-A, 210, 230, 610, or 710 described above with reference to FIG. 1, 2, 6, 7A, or 7B; a network management device; or the like.

As further shown in FIG. 8A, and by reference number 810, device 805 may generate a first plurality of composite colors 815 and a second plurality of composite colors 820 corresponding to values of a plurality of communication metrics at a plurality of time intervals. For example, device 805 may generate, for the first plurality of composite colors and the second plurality of composite colors, a plurality of composite colors representing a CRC result metric at a plurality of time intervals, a modulation and coding scheme (MCS) metric at the plurality of time intervals, a transport block (TB) size metric at the plurality of time intervals, or the like.

Device 805 may identify first plurality of composite colors 815 for the plurality of communication metrics at a first plurality of time intervals during which a network is in a stable condition (e.g., a radio link failure is not occurring). Device 805 may identify second plurality of composite colors 820 for the plurality of communication metrics at a second plurality of time intervals during which the network is entering a failure condition (e.g., a radio link failure is predicted to occur within a threshold period of time). Device 805 may process first plurality of composite colors 815 and second plurality of composite colors 820 using a machine learning technique (e.g., a deep learning algorithm) to train a model associated with identifying the stable condition of the network and the failure condition of the network based at least in part on image analysis of a plurality of composite colors.

As shown in FIG. 8B, and by reference number 825, device 805 may receive a plurality of measurements of values of a plurality of communication metrics from UE 830. In some aspects, UE 830 may correspond to one or more of the UEs 115, 115-A, 250, 615, 705 described above with reference to FIG. 1, 2, 6, 7A, or 7B.

As further shown in FIG. 8B, and by reference number 835, device 805 may generate a plurality of composite colors 840 based at least in part on the values of the plurality of communication metrics. As shown by reference number 845, device 805 may identify a condition of a network based at least in part on the plurality of composite colors and the model. For example, device 805 may perform an image analysis using the model generated based at least in part on the deep learning algorithm to determine that plurality of composite colors 840 and plurality of composite colors 820 are associated with a threshold similarity score indicating that the network is associated with entering a failure condition (e.g., a radio link failure). As shown by reference number 850, device 805 transmits an alert to UE 830 indicating that the radio link failure (RLF) is predicted for the network, and identifying an alteration to a parameter of UE 830 to configure UE 830 to improve network performance for the UE 830 and/or the network.

In this way, device 805 utilizes a composite color representation of a plurality of communication metrics to identify a condition of a network with a reduced utilization of processing resources relative to another technique that utilizes values of the plurality of communication metrics rather than the composite color representation, thereby improving network performance. Moreover, based at least in part on identifying the condition of the network, device 805 causes an alteration to a network configuration to improve network performance relative to another technique that utilizes a static network configuration.

As indicated above, FIGS. 8A and 8B are provided as an example. Other examples are possible and may differ from what was described in connection with FIGS. 8A and 8B.

FIG. 9 is a flow diagram of an example process 900 for generating a composite color to represent a communication metric, in accordance with various aspects of the present disclosure. In some aspects, one or more process blocks of FIG. 9 may be performed by a device, such as a base station 610, a UE 615, or the like. In some aspects, one or more process blocks of FIG. 9 may be performed by another type of device, such as a network management device, a SON device, or the like.

As shown in FIG. 9, process 900 may include receiving information identifying a plurality of measurements of a communication metric related to a network at a plurality of time intervals (block 910). For example, the device may receive information identifying the plurality of measurements of the communication metric related to the network at the plurality of time intervals. In some aspects, the device may receive information identifying a type of communication metric relating to a modem using the network, such as a CRC result metric, an MCS metric, a TB size metric, a new data indicator (NDI) metric, a metric relating to a number of layers used in a transmission, a metric relating to a number of radio base stations used for the network, a physical uplink control channel (PUCCH) metric (e.g., PUCCH TX power, PUCCH RX power, PUCCH TB size, or a number of PUCCH resource blocks), a reference signal received power (RSRP) metric, a reference signal received quality (RSRQ) metric, a metric relating to a number of detected cells, a plurality of metrics relating to a neighbor cell, or the like.

In some aspects, the device may receive information identifying a plurality of measurements of a communication metric at a plurality of time intervals. For example, the device may receive information identifying results of a plurality of measurements of a plurality of RSRQ values at a plurality of time intervals. Additionally, or alternatively, the device may receive information identifying a plurality of measurements of a plurality of communication metrics at a time interval. For example, the device may receive information identifying, for a time interval, an RSRP value and an RSRQ value. Additionally, or alternatively, the device may receive information identifying a plurality of measurements of a plurality of communication metrics at a plurality of time intervals. For example, the device may receive information identifying a plurality of RSRP values at a plurality of time intervals and a plurality of RSRQ values at the plurality of time intervals.

In some aspects, the device may receive the information identifying the plurality of measurements from a UE. For example, the device may cause a plurality of UEs to perform a plurality of measurements relating to the network, and provide information identifying the plurality of measurements to permit the device to identify a condition of the network (e.g., a radio link failure condition). Additionally, or alternatively, the device may receive the information identifying the plurality of measurements from an access point (e.g., a base station or an eNB). For example, the device may cause the access point to perform a plurality of measurements and provide the plurality of measurements to the device for processing. Additionally, or alternatively, the device may cause a combination of UEs and access points to perform a plurality of measurements, a component of the device to perform the plurality of measurements, or the like.

As shown in FIG. 9, process 900 may include determining a plurality of colors corresponding to the plurality of values of the communication metric (block 920). For example, the device may determine the plurality of colors corresponding to the plurality of values of the communication metric. In some aspects, the device may determine the plurality of colors for each of a plurality of color channels of a color model. For example, when the device is utilizing a red-green-blue (RGB) color model, the device may identify a first red color for a red color channel, a second green color for a green color channel, and a third blue color for a blue color channel. In this case, each color, of the plurality of colors, may represent a shade of a color channel, such as a shade of red, a shade of green, or a shade of blue. In some aspects, the device may utilize another color model, such as a CMYK color model, a Pantone color model, a greyscale color model, or the like.

In some aspects, the plurality of color channels may be associated with values for a plurality of time intervals. For example, the device may select the red color for the red color channel based at least in part on a value for the communication metric at a first time interval (e.g., time T−2 seconds), the green color for the green color channel based at least in part on a value for the communication metric at a second time interval (e.g., time T−1 second), and the blue color for the blue color channel based at least in part on a value for the communication metric at a third time interval (e.g., time T).

In some aspects, the device may normalize the plurality of values to determine the plurality of colors. For example, the device may normalize a value of the communication metric on a scale, such as a 0 to 1 scale, a −1 to 1 scale, or the like, relative to other values of the communication metric (e.g., other values of the communication metric at other time intervals, other potential values of the communication metric, or the like). In this case, the device may select a shade of a color for a color channel based at least in part on a normalized value of the value, such as based at least in part on determining a value of a shade (e.g., on a scale for the shade) that corresponds to the normalized value. In some aspects, the device may normalize the plurality of values using a scale, such as a linear scale, a non-linear scale (e.g., a logarithmic scale or an exponential scale), or the like.

As shown in FIG. 9, process 900 may include combining the plurality of colors to generate a composite color for the communication metric (block 930). For example, the device may combine the plurality of colors to generate the composite color for the communication metric. In some aspects, the device may overlay the plurality of colors using an additive procedure. For example, the device may overlay a shade of red of a red color channel, a shade of blue of a blue color channel, and a shade of green of a green color channel, to generate the composite color for the communication metric. In this case, the composite color for a time interval may represent the communication metric at a plurality of time intervals, such as a first time interval associated with the red color channel, a second time interval associated with the blue color channel, and a third time interval associated with the green color channel. In other words, the composite color at a time interval represents a trend of the communication metric at the time interval.

In some aspects, the device may combine the plurality of colors by adding a plurality of hexadecimal values representing the plurality of colors. For example, the device may add a first hexadecimal value of a first color representing a first value of the communication metric at a first time interval, a second hexadecimal value of a second color representing a second value of the communication metric at a second time interval, and a third hexadecimal value of a third color representing a third value of the communication metric at a third time interval. In this case, the device may identify a fourth hexadecimal value (e.g., a sum of the first, second, and third hexadecimal vales) as the composite color. In some aspects, the device may utilize another technique to combine the plurality of colors, such as by averaging a plurality of values associated with the plurality of colors (e.g., the plurality of hexadecimal values) or another technique.

In some aspects, the device may provide the composite color for processing. For example, the device may provide a plurality of composite colors (e.g., representing the communication metric at a plurality of time intervals, representing a plurality of communication metrics at a time interval, or representing a plurality of communication metrics at the plurality of time intervals), including the composite color, to train a model to identify a state of a network. In this case, the device may utilize the model to identify a subsequent state of a network based at least in part on a subsequently determined composite color, thereby permitting network maintenance and optimization to be performed. For example, the device may perform an image analysis of a plurality of composite colors to match the plurality of composite colors to a network state based on the model. In some aspects, the device may provide the composite color for storage. For example, the device may provide a plurality of composite colors for storage, thereby reducing a storage requirement for a plurality of communication metrics relative to another technique that stores time-series or numeric data representing the plurality of communication metrics.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a flow diagram of an example process 1000 for generating a composite color to represent a communication metric and utilizing the composite color to identify a state of a network, in accordance with various aspects of the present disclosure. In some aspects, one or more process blocks of FIG. 10 may be performed by a device, such as base station 610, UE 615, or the like. In some aspects, one or more process blocks of FIG. 10 may be performed by another type of device, such as a network management device, a SON device, or the like.

As shown in FIG. 10, process 1000 may include receiving information identifying a plurality of measurements of a communication metric related to a network at a plurality of time intervals (block 1010). For example, a device may receive information identifying the plurality of measurements of the communication metric related to the network at the plurality of time intervals. In some aspects, the device may receive the information based at least in part on requesting the information. For example, the device may request that one or more UEs, eNBs, or the like provide information identifying the plurality of measurements of the communication metric at the plurality of time intervals to permit the device to determine a condition of a network. In some aspects, the device may receive the information identifying the plurality of measurements without requesting the information. For example, periodically, a UE, an eNB, or the like may transmit the information to the device without receiving a request. Additionally, or alternatively, the UE maIn some aspects, the device may receive information identifying values of a plurality of communication metrics at the plurality of time intervals.

As shown in FIG. 10, process 1000 may include determining a plurality of colors corresponding to a plurality of values of the communication metric (block 1020). For example, the device may determine the plurality of colors corresponding to the plurality of values of the communication metric. In some aspects, the device may determine a plurality of colors for each time interval for which the device receives a value of the plurality of values. For example, the device may identify a first plurality of colors for a first time interval, T=4 seconds, and a second plurality of colors for a second time interval, T=5 seconds. In this case, the device may determine a first red color for the first time interval representing a value of the communication metric at T=2 seconds, a first green color for the first time interval representing a value of the communication metric at T=3 seconds, and a first blue color for the first time interval representing a value of the communication metric at T=4 seconds. Similarly, the device may determine a second red color for the second time interval representing the communication metric at T=3 seconds, a second green color for the second time interval representing the communication metric at T=4 seconds, and a second blue color for the second time interval representing the communication metric at T=5 seconds. In this way, the device determines a plurality of colors, which are combined into a composite color, to represent a change to the value of the communication metric over time at a time interval.

In some aspects, the device may determine a color, of the plurality of colors based on a value of the communication metric. For example, the device may normalize the value of the communication metric and determine a shade of a color channel corresponding to the normalized value of the communication metric, as described herein with regard to FIG. 9.

As shown in FIG. 10, process 1000 may include combining the plurality of colors to generate a composite color for the communication metric (block 1030). For example, the device may combine the plurality of colors to generate the composite color for the communication metric. In some aspects, the device may combine colors of the plurality of colors to generate a plurality of composite colors for the communication metric. For example, the device may combine a first red color for a first time interval representing a value of the communication metric at T=2 seconds, a first green color for the first time interval representing a value of the communication metric at T=3 seconds, and a first blue color for the first time interval representing a value of the communication metric at T=4 seconds to generate a first composite color for the first time interval of T=4 seconds. Similarly, the device may combine a second red color for a second time interval representing the value of the communication metric at T=3 seconds, a second green color for the second time interval representing the value of the communication metric at T=4 seconds, and a second blue color for the second time interval representing a value of the communication metric at T=5 seconds to generate a second composite color for the second time interval of T=5 seconds. In this way, the device generates a plurality of composite colors each associated with representing a change to the value of the communication metric over time at a time interval.

In some aspects, the device may generate a plurality of composite colors representing a plurality of communication metrics, as described herein with regard to FIG. 9. For example, the device may generate a first composite color representing an RSRP metric at a first time interval, a second composite color representing the RSRP metric at a second time interval, a third composite color representing an RSRQ metric at the first time interval, and a fourth composite color representing the RSRQ metric at the second time interval. In some aspects, the device may combine the plurality of composite colors to generate an image representing the network. For example, the device may combine the plurality of composite colors representing a plurality of communication metrics at a plurality of time intervals into an image, and may utilize the image to represent a state of a network.

As shown in FIG. 10, process 1000 may include providing information identifying the composite color for processing using a machine learning technique to train a model (block 1040). For example, the device may provide the information identifying the composite color for processing using the machine learning technique to train the model. In some aspects, the device may provide the information identifying the composite color for processing using a type of machine learning technique. For example, the device may provide information identifying a plurality of composite colors (e.g., one or more images representing one or more states of one or more networks) for processing utilizing a deep learning network technique, such as a neural tensor network technique, a convolutional neural network technique, or the like. In some aspects, the device may utilize an image processing technique. For example, the device may provide an image representing a state of a network for processing using an image processing technique, such as a computer vision technique, a neural network technique, or the like to train the model to identify the state of the network associated with the image.

In this way, based at least in part on representing a state of a network using a plurality of composite colors, a need to develop a customized machine learning solution is obviated relative to representing the state of the network using raw data from a modem, such as numeric data, time series data, or the like, thereby reducing cost, utilization of processing resources, and/or utilization of time resources associated with training the model. Moreover, deep learning network techniques may be poorly optimized for time-series or numeric data relative to image data. In this way, by utilizing a composite color representation of communication metrics, the device permits improved utilization of deep learning network techniques to identify the state of the network relative to maintaining the communication metrics as time-series or numeric data.

As shown in FIG. 10, process 1000 may include utilizing the model to identify a pattern associated with the communication metric (block 1050). For example, the device may utilize the model to identify the pattern associated with the communication metric. In some aspects, the device may generate another plurality of composite colors to utilize the model. For example, subsequent to training the model to identify a state of a network based at least in part on an image of a plurality of composite colors representing a plurality of communication metrics, the device may determine another plurality of composite colors representing a state of a network. In this case, the device may utilize the model to determine a state of the network associated with the plurality of composite colors. In some aspects, the device may alter a network configuration based at least in part on utilizing the model to identify the pattern. For example, based at least in part on predicting a radio link failure using the model, the device may transmit information identifying a configuration parameter to alter a configuration of a network device, such as a UE, an eNB, or the like to improve performance of the network based at least in part on identifying the state of the network.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Techniques described herein may be used to generate a composite color to represent a communication metric associated with a network. In this way, a utilization of computing resources associated with communicating a plurality of communication metrics, storing a plurality of communication metrics, or identifying a state of a network based at least in part on a plurality of communication metrics is reduced relative to utilizing raw data regarding the plurality of communication metrics.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based at least in part on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover: a; b; c; a and b; a and c; b and c; and a, b and c.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, information identifying a plurality of measurements of a communication metric related to a network at a plurality of time intervals;
   determining, by the device, a plurality of colors corresponding to a plurality of values of the communication metric,
      wherein each color, of the plurality of colors, is associated with a different time interval, of the plurality of time intervals, and
      wherein the plurality of values correspond to the plurality of measurements of the communication metric at the plurality of time intervals; and
   combining, by the device, the plurality of colors, associated with different time intervals, to generate a composite color for the communication metric.

2. The method of claim 1, further comprising:
   providing information identifying the composite color for processing using a machine learning technique to train a model.

3. The method of claim 2, further comprising:
   utilizing the model to identify a pattern associated with the communication metric.

4. The method of claim 1, wherein the communication metric is one of a plurality of communication metrics; and further comprising:
   providing information identifying a plurality of composite colors for the plurality of communication metrics.

5. The method of claim 1, wherein the composite color is one of a plurality of composite colors associated with the communication metric,
   each composite color, of the plurality of composite colors, to represent another plurality of time intervals at which the communication metric is measured; and
   further comprising:
      providing information identifying the plurality of composite colors for the communication metric.

6. The method of claim 1, wherein the communication metric represents a metric associated with a modem of the network.

7. The method of claim 1, further comprising:
   normalizing the plurality of values of the communication metric; and wherein determining the plurality of colors comprises determining the plurality of colors based at least in part on normalizing the plurality of values of the communication metric.

8. The method of claim 1, wherein determining the plurality of colors comprises:
determining, for a first time interval of the plurality of time intervals, a first shade of a first color based at least in part on a first value of the plurality of values; and
determining, for a second time interval of the plurality of time intervals, a second shade of a second color based at least in part on a second value of the plurality of values,
the first color being different from the second color.

9. The method of claim 1, wherein the plurality of colors correspond to at least one of:
a red green blue (RGB) color model plurality of colors,
a cyan, magenta, yellow, key (CMYK) color model plurality of colors,
a Pantone model plurality of colors, or
a grayscale plurality of colors.

10. A device, comprising:
one or more processors to:
receive information identifying a plurality of measurements of a communication metric related to a network at a plurality of time intervals;
determine a plurality of colors corresponding to a plurality of values of the communication metric,
wherein each color, of the plurality of colors, is associated with a different time interval, of the plurality of time intervals, and
wherein the plurality of values correspond to the plurality of measurements of the communication metric at the plurality of time intervals; and
combine the plurality of colors, associated with different time intervals, to generate a composite color for the communication metric.

11. The device of claim 10, wherein the one or more processors are further to:
provide the information identifying the composite color for processing using a machine learning technique to train a model.

12. The device of claim 11, wherein the one or more processors are further to:
utilize the model to identify a pattern associated with the communication metric.

13. The device of claim 10, wherein the communication metric is one of a plurality of communication metrics; and
wherein the one or more processors are further to:
provide information identifying a plurality of composite colors for the plurality of communication metrics.

14. The device of claim 10, wherein the composite color is one of a plurality of composite colors associated with the communication metric,
each composite color, of the plurality of composite colors, representing another plurality of time intervals at which the communication metric is measured; and
wherein the one or more processors are further to:
provide information identifying the plurality of composite colors for the communication metric.

15. The device of claim 10, wherein the communication metric represents a metric associated with a modem of the network.

16. The device of claim 10, wherein the one or more processors are further to:
normalize the plurality of values of the communication metric; and
wherein the one or more processors, when determining the plurality of colors, are to determine the plurality of colors based at least in part on normalizing the plurality of values of the communication metric.

17. The device of claim 10, wherein the one or more processors, when determining the plurality of colors, are to:
determine, for a first time interval of the plurality of time intervals, a first shade of a first color based at least in part on a first value of the plurality of values; and
determine, for a second time interval of the plurality of time intervals, a second shade of a second color based at least in part on a second value of the plurality of values,
the first color being different from the second color.

18. The device of claim 10, wherein the plurality of colors correspond to at least one of:
a red green blue (RGB) color model plurality of colors,
a cyan, magenta, yellow, key (CMYK) color model plurality of colors,
a Pantone model plurality of colors, or
a grayscale plurality of colors.

19. A non-transitory computer-readable medium storing instructions, the instructions comprising:
one or more instructions that, when executed by one or more processors of a device, cause the one or more processors to:
receive information identifying a plurality of measurements of a communication metric related to a network at a plurality of time intervals;
determine a plurality of colors corresponding to a plurality of values of the communication metric,
wherein each color, of the plurality of colors, is associated with a different time interval, of the plurality of time intervals, and
wherein the plurality of values correspond to the plurality of measurements of the communication metric at the plurality of time intervals; and
combine the plurality of colors, associated with different time intervals, to generate a composite color for the communication metric.

20. The non-transitory computer-readable medium of claim 19, wherein the one or more instructions, when executed by the one or more processors, further cause the one or more processors to:
provide the information identifying the composite color for processing using a machine learning technique to train a model.

21. The non-transitory computer-readable medium of claim 20, wherein the one or more instructions, when executed by the one or more processors, further cause the one or more processors to:
utilize the model to identify a pattern associated with the communication metric.

22. The non-transitory computer-readable medium of claim 19, wherein the communication metric is one of a plurality of communication metrics; and
wherein the one or more instructions, when executed by the one or more processors, further cause the one or more processors to:
provide information identifying a plurality of composite colors for the plurality of communication metrics.

23. The non-transitory computer-readable medium of claim 19, wherein the composite color is one of a plurality of composite colors associated with the communication metric, each composite color, of the plurality of composite colors, representing another plurality of time intervals at which the communication metric is measured; and wherein the one or more instructions, when executed by the one or more processors, further cause the one or more processors to:

provide information identifying the plurality of composite colors for the communication metric.

24. The non-transitory computer-readable medium of claim 19, wherein the communication metric represents a metric associated with a modem of the network.

25. The non-transitory computer-readable medium of claim 19, wherein the one or more instructions, when executed by the one or more processors, further cause the one or more processors to:

normalize the plurality of values of the communication metric; and wherein the one or more instructions, that cause the one or more processors to determine the plurality of colors, cause the one or more processors to determine the plurality of colors based at least in part on normalizing the plurality of values of the communication metric.

26. The non-transitory computer-readable medium of claim 19, wherein the one or more instructions, that cause the one or more processors to determine the plurality of colors, cause the one or more processors to:

determine, for a first time interval of the plurality of time intervals, a first shade of a first color based at least in part on a first value of the plurality of values; and determine, for a second time interval of the plurality of time intervals, a second shade of a second color based at least in part on a second value of the plurality of values, the first color being different from the second color.

27. The non-transitory computer-readable medium of claim 19, wherein the plurality of colors correspond to at least one of:

a red green blue (RGB) color model plurality of colors, a cyan, magenta, yellow, key (CMYK) color model plurality of colors, a Pantone model plurality of colors, or a grayscale plurality of colors.

28. An apparatus, comprising:

means for receiving information identifying a plurality of measurements of a communication metric related to a network at a plurality of time intervals;

means for determining a plurality of colors corresponding to a plurality of values of the communication metric, wherein each color, of the plurality of colors, is associated with a different time interval, of the plurality of time intervals, and wherein the plurality of values correspond to the plurality of measurements of the communication metric at the plurality of time intervals; and means for combining the plurality of colors, associated with different time intervals, to generate a composite color for the communication metric.

29. The apparatus of claim 28, further comprising:

means for providing the information identifying the composite color for processing using a machine learning technique to train a model.

30. The apparatus of claim 29, further comprising:

means for utilizing the model to identify a pattern associated with the communication metric.

* * * * *